US007272255B2

(12) United States Patent
Ishiyama

(10) Patent No.: US 7,272,255 B2
(45) Date of Patent: Sep. 18, 2007

(54) THREE-DIMENSIONAL BODY PHOTOGRAPHY APPARATUS, THREE-DIMENSIONAL GEOMETRICMODEL GENERATION APPARATUS, THREE-DIMENSIONAL GEOMETRIC MODEL GENERATION METHOD, AND RECORD MEDIUM IN WHICH THREE-DIMENSIONAL GEOMETRIC MODEL GENERATION PROGRAM WAS STORED

(75) Inventor: Rui Ishiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 713 days.

(21) Appl. No.: 10/342,745

(22) Filed: Jan. 15, 2003

(65) Prior Publication Data

US 2003/0169917 A1    Sep. 11, 2003

(30) Foreign Application Priority Data

Jan. 15, 2002    (JP)    .............................. 2002-005617

(51) Int. Cl.
*G06K 9/00* (2006.01)
*G03B 15/02* (2006.01)
(52) U.S. Cl. ........................... 382/154; 382/118; 396/4
(58) Field of Classification Search ................ 382/118, 382/154; 396/4
See application file for complete search history.

(56) References Cited

U.S. PATENT DOCUMENTS

| 1,631,593 | A | * | 6/1927 | Josepho | .......................... | 396/4 |
| 1,799,866 | A | * | 4/1931 | Roth | .............................. | 396/3 |
| 2,345,235 | A | * | 3/1944 | Carter, Jr. | .................... | 362/140 |
| 3,821,764 | A | * | 6/1974 | Shelton | ...................... | 396/155 |
| 4,752,964 | A | * | 6/1988 | Okada et al. | ................ | 382/154 |
| 4,757,379 | A | * | 7/1988 | Wright | ......................... | 348/42 |

(Continued)

FOREIGN PATENT DOCUMENTS

JP        10-020370 A    1/1998

(Continued)

OTHER PUBLICATIONS

Open GL Programming guide by Addison-Wesley, pp. 169-211.

(Continued)

*Primary Examiner*—Matthew C. Bella
*Assistant Examiner*—Utpal Shah
(74) *Attorney, Agent, or Firm*—Scully, Scott, Murphy & Presser, PC

(57) ABSTRACT

Three-dimensional geometric model generation method, apparatus and record medium for generating a three-dimensional geometric model indicating visual information of a three-dimensional body, comprising: simultaneously radiating light against a predetermined plane of the three-dimensional body from a frontal direction, a left and lower direction, and a right and lower direction of the above predetermined plane to uniformly illuminate the predetermined plane; photographing a predetermined plane of the three-dimensional body, to which the light was radiated, at least from one direction to acquire an image of the predetermined plane of the three-dimensional body having neither a shadow nor shading; and based on three-dimensional shape data indicating a three-dimensional shape of a predetermined plane of the three-dimensional body, and the image that was photographed, by acquiring a brightness value at each point of the three-dimensional shape of the three-dimensional body as the visual information, generating the three-dimensional geometric model of the three-dimensional body.

1 Claim, 12 Drawing Sheets

U.S. PATENT DOCUMENTS

| | | | |
|---|---|---|---|
| 5,043,922 A * | 8/1991 | Matsumoto | 345/422 |
| 5,648,853 A * | 7/1997 | Stern et al. | 356/394 |
| 5,974,168 A * | 10/1999 | Rushmeier et al. | 382/141 |
| 6,781,583 B2 * | 8/2004 | Blaho | 345/426 |
| 6,792,401 B1 * | 9/2004 | Nigro et al. | 703/6 |
| 6,850,872 B1 * | 2/2005 | Marschner et al. | 703/2 |
| 2002/0186878 A1 * | 12/2002 | Hoon et al. | 382/149 |

FOREIGN PATENT DOCUMENTS

| | | |
|---|---|---|
| JP | 10-048705 A | 2/1998 |
| JP | 10-239737 A | 9/1998 |
| JP | 2000-4937 | 1/2000 |
| JP | 2001-209141 A | 8/2001 |
| JP | 2001-283216 | 10/2001 |
| JP | 2001-298655 A | 10/2001 |
| JP | 2002-005617 | 9/2006 |

OTHER PUBLICATIONS

English translation of Japanese Office Action dated Sep. 7, 2006.
Japanese Final Office Action dated Dec. 15, 2006, together with an English-language translation.

* cited by examiner

SHADING IS DARKLY ATTACHED TO CHEEK REGIONS

SHADOW OF NOSE BY LEFT ILLUMINATION

SHADOW OF NOSE BY RIGHT ILLUMINATION

800 ROOM LAMP AT LOCATION IN WHICH MEASUREMENT IS MADE

701 PROJECTOR FOR PATTERN PROJECTION

PHOTOGRAPHY APPARATUS 700

702 CAMERA

THREE-DIMENSIONAL BODY PHOTOGRAPHY APPARATUS, THREE-DIMENSIONAL GEOMETRICMODEL GENERATION APPARATUS, THREE-DIMENSIONAL GEOMETRIC MODEL GENERATION METHOD, AND RECORD MEDIUM IN WHICH THREE-DIMENSIONAL GEOMETRIC MODEL GENERATION PROGRAM WAS STORED

BACKGROUND OF THE INVENTION

The present invention relates to technology of generating a three-dimensional geometric model that is composed of visual information of a three-dimensional body, and more particular to a three-dimensional body photography apparatus for photographing an image of a three-dimensional body having neither a shadow nor shading for employment in generating the three-dimensional geometric model, a three-dimensional geometric model generation apparatus, a three-dimensional geometric model generation method, and a three-dimensional geometric model generation program.

In recent years, computer graphics (Hereinafter, referred to as CG for short) technology has developed remarkably. For this reason, scene images under various situations has become possible to render realistically based on the three-dimensional geometric model that is composed of visual information of the three-dimensional body.

In particular, a human body or a face is one of important objects as an object of rendering, and generation of its precise three-dimensional geometric model has be come of importance. In the conventional three-dimensional geometric model, three-dimensional shape data indicating a three-dimensional shape (three-dimensional coordinates of the surface etc.) of the three-dimensional body to be taken as an object, and visual information such as color and a reflectance at each position on its surface are employed.

If there is the three-dimensional geometric model of the face of a person, it is possible to freely generate a face image having posture, illumination conditions, or expression etc. altered by employing the technology of the CG. As to this technology of the CG, for example, it was described in details in "Open GL programming guide" by Addison-Wesley (4-7952-9710-X).

By these kinds of the CG technology, production of realistic animation video becomes possible. Also, application of producing a simulation system is also possible in which a favorite is selected by changing glasses and a hair style etc. to view it from a free viewpoint, and so forth.

Also, in JP-P2001-283216A entitled "BODY COLLATION METHOD, BODY COLLATION APPARATUS, AND RECORD MEDIUM IN WHICH PROGRAM THEREOF WAS RECORDED." invented by this inventor, a system was disclosed in which the measured three-dimensional geometric model and color data was employed to generate the face image at the time that the illumination conditions and the posture were altered, and collation was made possible of the face image photographed under various conditions such as a monitoring camera.

By the way, in the event of generating the face image at the time of having altered the posture of a figure, with knowledge of a correspondence relation between each pixel of the face image and each of three-dimensional coordinates (three-dimensional shape data) on the surface of its face, it is enough, and a perspective conversion model is frequently employed as a camera model for describing this.

In the perspective conversion model, in the event that three-dimensional coordinates at each point P of the three-dimensional geometric model of the face were taken as (X, Y, Z), coordinates of the pixel of the image as (u, v), a rotation matrix indicating the posture of the face as R, a position of the face as (Tx, Ty, Tz), and a focal length of the camera as f, the following expression of Eq. 1 is given.

$$\begin{bmatrix} x' \\ y' \\ z' \end{bmatrix} = R \begin{bmatrix} x \\ y \\ z \end{bmatrix} + \begin{bmatrix} T_x \\ T_y \\ T_z \end{bmatrix} \quad (1)$$

$$\begin{bmatrix} u \\ v \end{bmatrix} = \frac{f}{z'} \begin{bmatrix} x' \\ y' \end{bmatrix}$$

By employing Eq. 1 on each point P of the three-dimensional coordinates on the surface of the face, the coordinates of the pixel of its face image are found. And, by painting the above pixel with color of the point P, the face image at the posture R and the position (Tx, Ty, Tz) can be generated.

The CG technology described above allows the face image that takes an optional posture to be rendered, if there are three-dimensional shape data of the face, and color data of the surface. As to the color data for employment at this time, it is general to utilize a brightness value of the image photographed under appropriate illumination conditions as it stands. The above image is called a texture image. Also, a method of employing the brightness value of the above texture image as the color data to render the image is called a texture mapping.

Further, in the event of generating the image at the time of having altered illumination, a reflection model is utilized for describing how brightness on the image of each portion of the three-dimensional body surface alters depending upon a direction of the illumination.

A Lambertian model is a reflection model to be frequently employed for finding the brightness value on the image of each portion of the three-dimensional body that alters depending upon how the illumination is applied. This Lambertian model and the perspective conversion model are normally rigged as a graphics function of a general computer (workstation), and are widely employed.

In the Lambertian model, in the event that a direction of a light source was taken as $\vec{L}$, strength of the light source as $|\vec{L}|$, a vector normal to each point $\vec{P}$ of the three-dimensional body (face) as $\vec{n}$, and a reflectance of the surface as A, a brightness value I of the point P on the image is calculated by the following expression of Eq. 2.

$$I = A\vec{n} \cdot \vec{L} \quad (2)$$

Not only in the Lambertian model explained here, but also in the other models in which discoloration by pressing etc. was considered, similarly to the expression of Eq. 2, the brightness value of the image is calculated with the three-dimensional shape data (x, y, z), the direction $\vec{n}$ normal to the surface to be obtained from it, and the color data of the surface (and reflectance data) A.

Accordingly, if there are the three-dimensional geometric model of the three-dimensional body, i.e. the three-dimensional shape data, and the color data (and the reflectance data) indicating visual information of the surface, it is possible to generate as the CG the image in the event that the illumination exists in an optional direction $\vec{L}$.

As to a technique of measuring the three-dimensional shape and the surface color of the three-dimensional body, there are various ones. For example, the three-dimensional shape data is measured by analyzing the image photographed by projecting a specific light pattern to the face. Additionally, with regard to the measurement of the three-dimensional shape by a method of projecting the light pattern etc. it is well known to those skilled in the art of the present invention, whereby its explanation is omitted.

In these prior arts, a normal two-dimensional image, to which the pattern was not projected, was photographed as a texture image to the measurement of the three-dimensional shape data simultaneously with, just before, or just after photographing said projected pattern image, and the above texture image was employed as the color data of the three-dimensional body surface for generating the three-dimensional geometric model.

This is because a special measuring apparatus becomes necessary separately for accurately measuring the reflectance, which takes much time. Said texture image is an image in which an influence of a shadow and shading that occurred depending upon how the illumination was applied was added to the reflectance; however this was employed in an approximation-technique manner as a substitute for the reflectance in the prior art.

In the prior arts as mentioned above, the problems as described below existed.

In generating the conventional three-dimensional geometric model, it was difficult to accurately measure the color data and the reflectance data A of each of the three-dimensional coordinates of the three-dimensional body surface to be utilized in the texture mapping, whereby the texture image (two-dimensional image) of the three-dimensional body was employed as a substitute for this.

However, the shadow and the shading occurred to the texture image of the three-dimensional body to be employed as a substitute, whereby the problem existed: the accurate three-dimensional geometric model was impossible to generate.

FIG. 11 and FIG. 12 are views illustrating photography apparatuses 700 and 710 for photographing the texture image for employment in generating the above-mentioned conventional three-dimensional geometric model of the face of the person. FIG. 11 illustrates a technique of utilizing brightness of a room lamp 800 in the location, in which measurement is made without employing a special light source, for photography. FIG. 12 illustrates a technique of illuminating the face with a lamp of a projector 721 for projecting the light pattern to be employed for measuring the three-dimensional shape data for photography.

However, the shadow and the shading occurred to the texture image photographed by such conventional photography apparatuses 700 and 710, whereby the accurate three-dimensional geometric model is impossible to generate. As a result, the image having the posture altered, which was generated by means of the texture mapping, became unattractive.

Also, in the event of utilizing brightness of the room lamp 800 for photography as shown in FIG. 11, the problem exists of being influenced by circumstances of the location in which measurement is made. In the event that the texture image was photographed in such illumination conditions that strong illumination was applied from the right direction of the face, for example, such as the case that a window existed in the right direction of the face and daylight shined, and the case that a wall stood in the left side and plenty of room lamps existed in the right side, to take this as color data for generating the three-dimensional geometric model, the texture image of the face has the shadow that occurred in the left side of a nose as shown in FIG. 10. When such an image that the shadow exists in the left of the nose and the left side of the face is dark is intended to be employed as a texture to generate and view the image from the left side by turning the face, it became an image photographed in the backlight situation, of which visible part was wholly dark.

That is, in the event of desiring to view a clear face image from an optional direction, the texture image needs to be photographed in the situation that the entirety of the face is uniformly illuminated so as to cause the shadow not to occur if circumstances allow.

In the prior art, however, a method was not considered of establishing appropriate illumination conditions for photographing the texture image, whereby the produced CG image became unattractive.

Also, in the prior art, it was not considered to employ the texture image in generating the three-dimensional geometric model as a substitute for said reflectance data A.

It was taken into account to utilize it merely as the color data for display, whereby the appropriate illumination conditions were not established at the time of photographing the texture image. For this reason, the brightness value of the photographed texture image, to which an influence of the shadow and the shading occurred, becomes much different from said reflectance data A. As a result, the texture image was impossible to employ in generating the three-dimensional geometric model in substitution for said reflectance data A.

That is, the light source needs to be arranged at an appropriate position and to be employed so that the shadow and the local shading of the nose do not occur at the time of photographing the texture image. Otherwise, the image generated by means of the CG technology from the three-dimensional geometric model generated by employing the photographed texture image becomes an unimpressive image having the unnatural shadow and shading attached.

For example, in FIG. 11 described above, in the event of employing the image in which the illumination was applied to the face from the left to generate the three-dimensional geometric model by the model of the expression of Eq. 2, it is hardly possible that the shadow intrinsically occurs to the left side of the nose. However, as to the shadowed part of the texture image, its reflectance became a smaller value as compared with intrinsic color. For this reason, such an unnatural image that the shadow existed on the left side even though the illumination was applied from the left was sometimes produced. Also in the event of FIG. 12, the unnatural image in which light was applied from the lower direction became a texture image, whereby the similar problem occurred.

Also, as another example, now think of the case that light was radiated to the face from a front of the face for photography like a photography apparatus 720 of FIG. 13. In this case, the problem of the shadow of the nose becomes small.

In this case, however, as shown in FIG. 9, an angle between a direction normal to the face surface and a direction of the illumination becomes large in the cheek part, whereby the brightness value of the texture image photographed in this part results in being low (dark). Accordingly, even though a forehead part and the cheek part are almost identical in terms of true color (and the reflectance), the problem existed that the cheek part became dark remarkably, and the image generated by means of the CG technology became unnatural.

In such a manner, when the image having the shadow and shading, which was photographed under the non-uniform illumination, is employed (instead of color and reflectance data) to generate the three-dimensional geometric model, the image generated by means of the CG by altering the viewpoint and the illumination conditions looks unimpressive, and becomes an unnatural image.

Thus, the task to be solved by the present invention is to provide a three-dimensional body photography apparatus, a three-dimensional geometric model generation apparatus, a three-dimensional geometric model generation method, and a three-dimensional geometric model generation program that realize generation of the CG that looks impressive by, in the event of generating a three-dimensional geometric model of a rugged three-dimensional body such as the face of the person, photographing the texture image having neither the shadow nor the shading by applying the uniform illumination to the entirety of the surface of its three-dimensional body, and employing this texture image to generate the three-dimensional geometric model.

SUMMARY OF THE INVENTION

An objective of the present invention lies in solving the above-mentioned problems.

A first invention for solving the above-mentioned tasks is a three-dimensional body photography apparatus for generating a three-dimensional geometric model that is composed of visual information of a three-dimensional body, photographing said three-dimensional body, said three-dimensional body photography apparatus being characterized in comprising: light radiation means for simultaneously radiating light against a predetermined plane of said three-dimensional body from a frontal direction, a left and lower direction, and a right and lower direction of the above predetermined plane to uniformly illuminate said predetermined plane; and photography means for photographing a predetermined plane of said three-dimensional body, to which said light was radiated, at least from one direction; and in that an image of said predetermined plane of said three-dimensional body having neither a shadow nor shading is acquired by said photography means.

A second invention for solving the above-mentioned tasks is characterized in that, in the above-mentioned first invention, a filter for diffusing light to be radiated from said light radiation means to radiate it to said predetermined plane of said three-dimensional body was provided.

A third invention for solving the above-mentioned tasks is characterized in that, in the above-mentioned first invention, said three-dimensional body is a face of a human, and said light radiation means simultaneously radiates light against a front of said face from its frontal direction, and a left and lower direction and a right and lower direction to which lines normal to left and right cheeks of said face point respectively.

A fourth invention for solving the above-mentioned tasks is characterized in that, in the above-mentioned first invention, said light radiation means is composed of one light source or more, and one reflector plate or more for reflecting light from the above light source (s), and simultaneously radiates light reflected from said reflector plate (s) at least from the left and lower direction, and the right and lower direction of said three-dimensional body.

A fifth invention for solving the above-mentioned tasks is characterized, in the above-mentioned first invention: in further comprising light pattern radiation means for radiating a light pattern that is composed of a specific pattern against said predetermined plane of said three-dimensional body; and in that an image for measuring a three-dimensional shape in said predetermined plane of said three-dimensional body is acquired by photographing said three-dimensional body, to which said specific pattern was radiated by said light pattern radiation means, by said photography means.

A sixth invention for solving the above-mentioned tasks is a three-dimensional geometric model generation apparatus for generating a three-dimensional geometric model indicating visual information of a three-dimensional body, said three-dimensional geometric model generation apparatus being characterized in comprising: light radiation means for simultaneously radiating light against a predetermined plane of said three-dimensional body from a frontal direction, a left and lower direction, and a right and lower direction of the above predetermined plane to uniformly illuminate said predetermined plane; and photography means for photographing a predetermined plane of said three-dimensional body, to which said light was radiated, at least from one direction to acquire an image of said predetermined plane of said three-dimensional body having neither a shadow nor shading; and based on three-dimensional shape data indicating a three-dimensional shape of a predetermined plane of said three-dimensional body, and said image that was photographed, by acquiring a brightness value at each point of said three-dimensional shape of said three-dimensional body as said visual information, means for generating said three-dimensional geometric model of said three-dimensional body.

A seventh invention for solving the above-mentioned tasks is characterized in that, in the above-mentioned sixth invention, a filter for diffusing light to be radiated from said light radiation means to radiate it to said predetermined plane of said three-dimensional body was provided.

An eighth invention for solving the above-mentioned tasks is characterized in that, in the above-mentioned sixth invention, said three-dimensional body is a face of a human, and said light radiation means simultaneously radiates light against a front of said face from its frontal direction, and a left and lower direction and a right and lower direction to which lines normal to left and right cheeks of said face point respectively.

A ninth invention for solving the above-mentioned tasks is characterized in that, in the above-mentioned sixth invention, said light radiation means is composed of one light source or more, and one reflector plate or more for reflecting light from the above light source (s), and simultaneously radiates light reflected from said reflector plate (s) at least from the left and lower direction, and the right and lower direction of said three-dimensional body.

A tenth invention for solving the above-mentioned tasks is characterized in that, in the above-mentioned sixth invention, said light radiation means comprises an independent enclosure-type light source, and said light is radiated against a predetermined plane of said three-dimensional body at least from one out of said three directions by said light source.

An eleventh invention for solving the above-mentioned tasks is characterized, in the above-mentioned sixth invention, in having: a main body section having a central part thereof sunken in a concave shape; and said frontal-direction light radiation means provided in a center of said main body section, said left and said right light radiation means provided in arms provided in the left and the right of said main body section respectively, and yet said photography means provided in fronts of the right and the left of said main body section respectively.

A twelfth invention for solving the above-mentioned tasks is characterized, in the above-mentioned sixth invention: in further comprising light pattern radiation means for radiating a light pattern that is composed of a specific pattern against said predetermined plane of said three-dimensional body; and in that an image for measuring a three-dimensional shape in said predetermined plane of said three-dimensional body is acquired by photographing said three-dimensional body, to which said specific light pattern was radiated by said light pattern radiation means, by said photography means.

A thirteenth invention for solving the above-mentioned tasks is a three-dimensional geometric model generation method of generating a three-dimensional geometric model indicating visual information of a three-dimensional body, said three-dimensional geometric model generation method being characterized in comprising: a light radiation step of simultaneously radiating light against a predetermined plane of said three-dimensional body from a frontal direction, a left and lower direction, and a right and lower direction of the above predetermined plane to uniformly illuminate said predetermined plane; and a photography step of photographing a predetermined plane of said three-dimensional body, to which said light was radiated, at least from one direction to acquire an image of said predetermined plane of said three-dimensional body having neither a shadow nor shading; and based on three-dimensional shape data indicating a three-dimensional shape of a predetermined plane of said three-dimensional body, and said image that was photographed, by acquiring a brightness value at each point of said three-dimensional shape of said three-dimensional body as said visual information, a step of generating said three-dimensional geometric model of said three-dimensional body.

A fourteenth invention for solving the above-mentioned tasks is characterized in that, in the above-mentioned thirteenth invention, said three-dimensional body is a face of a human, and, in said light radiation step, light is simultaneously radiated against a front of said face from its frontal direction, and a left and lower direction and a right and lower direction to which lines normal to left and right cheeks of said face point respectively.

A fifteenth invention for solving the above-mentioned tasks is characterized, in the above-mentioned thirteenth invention, in comprising: a light pattern radiation step of radiating a light pattern that is composed of a specific pattern against said predetermined plane of said three-dimensional body; and a step of, by photographing said three-dimensional body to which said specific light pattern was radiated, acquiring an image for measuring a three-dimensional shape in said predetermined plane of said three-dimensional body.

A sixteenth invention for solving the above-mentioned tasks is a record medium in which was recorded a three-dimensional geometric model generation program for generating a three-dimensional geometric model indicating visual information of a three-dimensional body, wherein are realized: a light-radiation function of simultaneously radiating light against a predetermined plane of said three-dimensional body from a frontal direction, a left and lower direction, and a right and lower direction of the above predetermined plane to uniformly illuminate said predetermined plane; and a photography function of photographing a predetermined plane of said three-dimensional body, to which said light was radiated, at least from one direction to acquire an image of said predetermined plane of said three-dimensional body having neither a shadow nor shading; and based on three-dimensional shape data indicating a three-dimensional shape of a predetermined plane of said three-dimensional body, and said image that was photographed, by acquiring a brightness value at each point of said three-dimensional shape of said three-dimensional body as said visual information, a function of generating said three-dimensional geometric model of said three-dimensional body.

A seventeenth invention for solving the above-mentioned tasks is characterized in that, in the above-mentioned sixteenth invention, said three-dimensional body is a face of a human, and, in said light radiation function, light is simultaneously radiated against a front of said face from its frontal direction, and a left and lower direction and a right and lower direction to which lines normal to left and right cheeks of said face point respectively.

An eighteenth invention for solving the above-mentioned tasks is characterized, in the above-mentioned sixteenth invention, in realizing: a light pattern radiation function of radiating a light pattern that is composed of a specific pattern against said predetermined plane of said three-dimensional body; and a function of, by photographing said three-dimensional body to which said specific pattern was radiated, acquiring an image for measuring a three-dimensional shape in said predetermined plane of said three-dimensional body.

BRIEF DESCRIPTION OF THE DRAWING

This and other objects, features and advantages of the present invention will become more apparent upon a reading of the following detailed description and drawings, in which.

DESCRIPTION OF THE EMBODIMENTS

Next, embodiments of the present invention will be explained.

Figure 4:
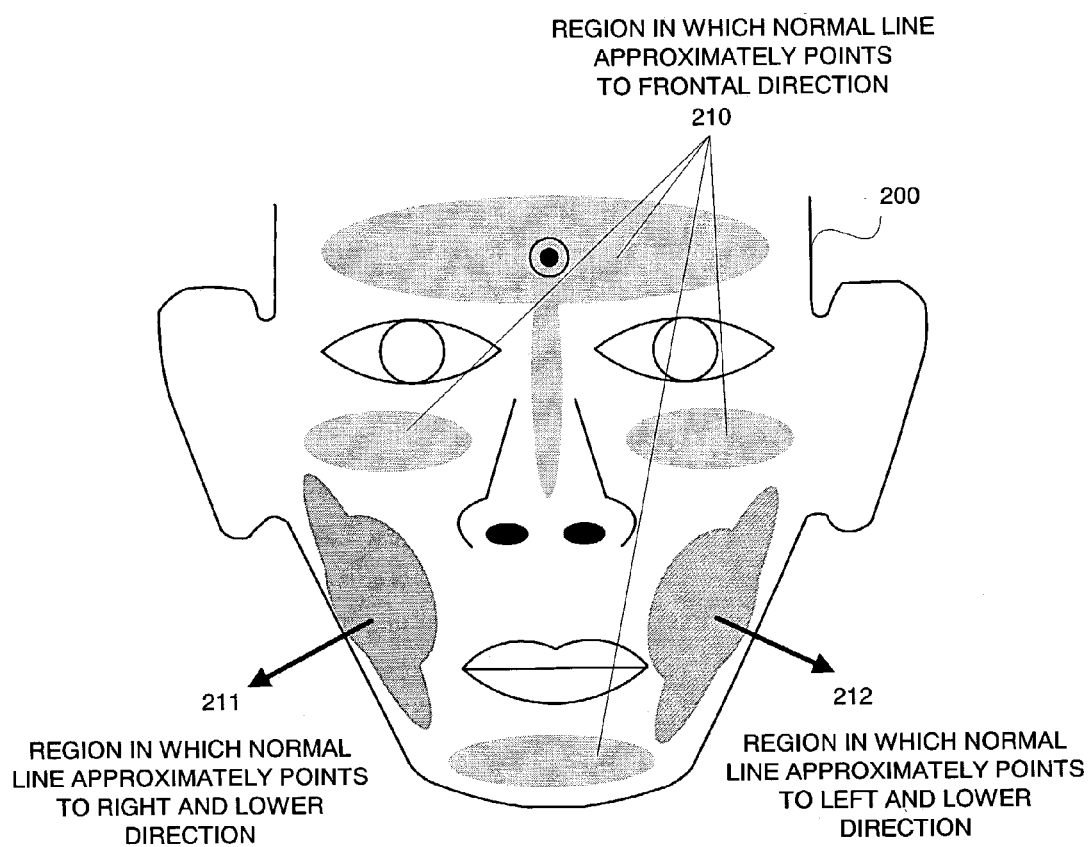
FIG. 4 is a view illustrating a status that a face of a person of the first embodiment of the present invention that was divided into three based on normal directions.

Herein, a basic structure of a face common to all persons is a structure in which a nose projects in a frontal direction, and a large part of the face surface can be roughly divided into three portions of a frontal-direction plane 210 with a forehead centered, a right and lower direction plane 211 and a left and lower direction plane 212 with right and left cheeks centered respectively as shown in FIG. 4. When illuminations are arranged in directions normal to these three portions to uniformly illuminate the entirety of the face, no shadow of the nose is cast on the face. Such characteristics are utilized in the present invention.

Figure 1:
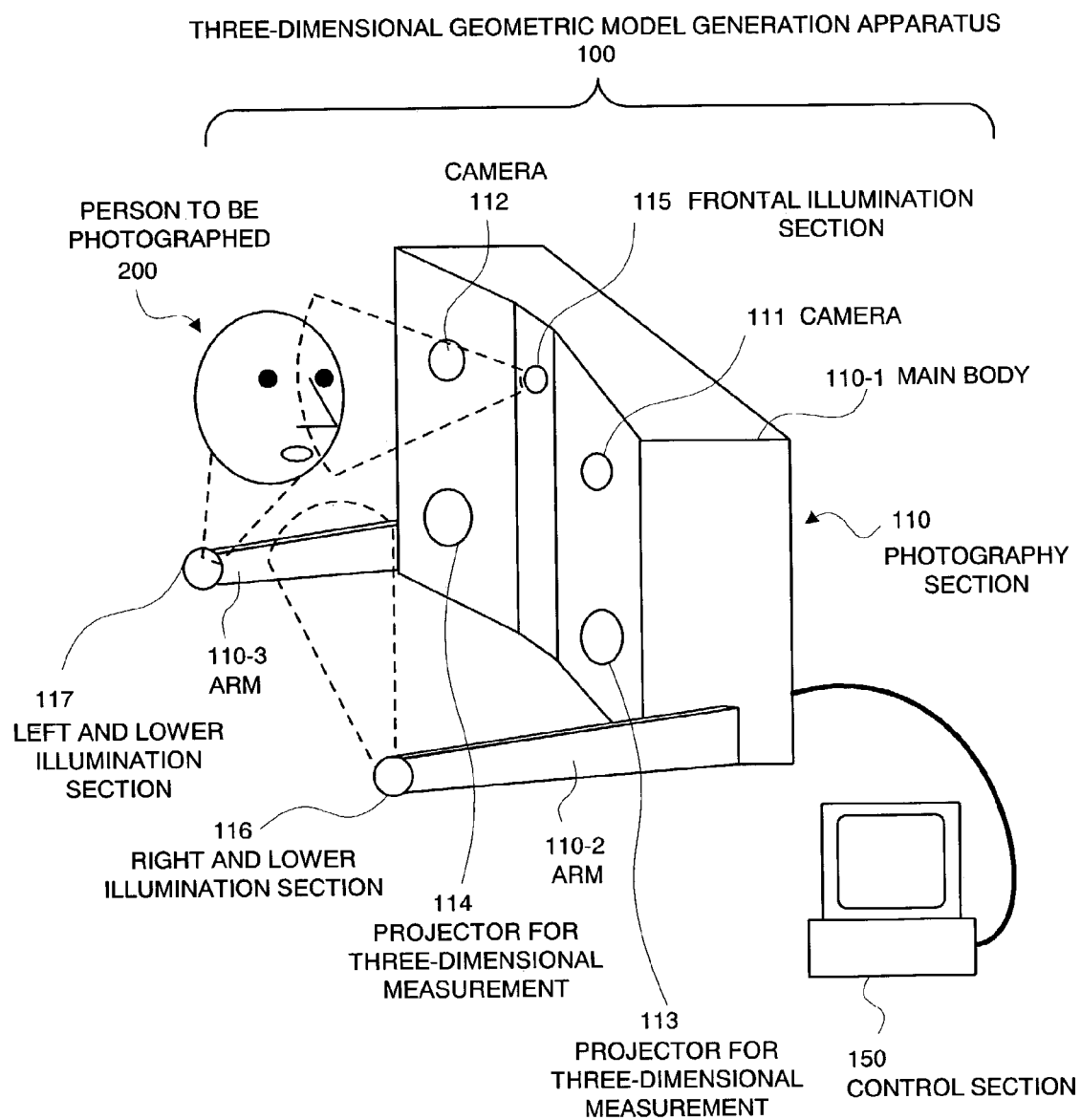
FIG. 1 is a view illustrating a configuration of a three-dimensional geometric model generation apparatus in accordance with a first embodiment of the present invention.
Figure 2:
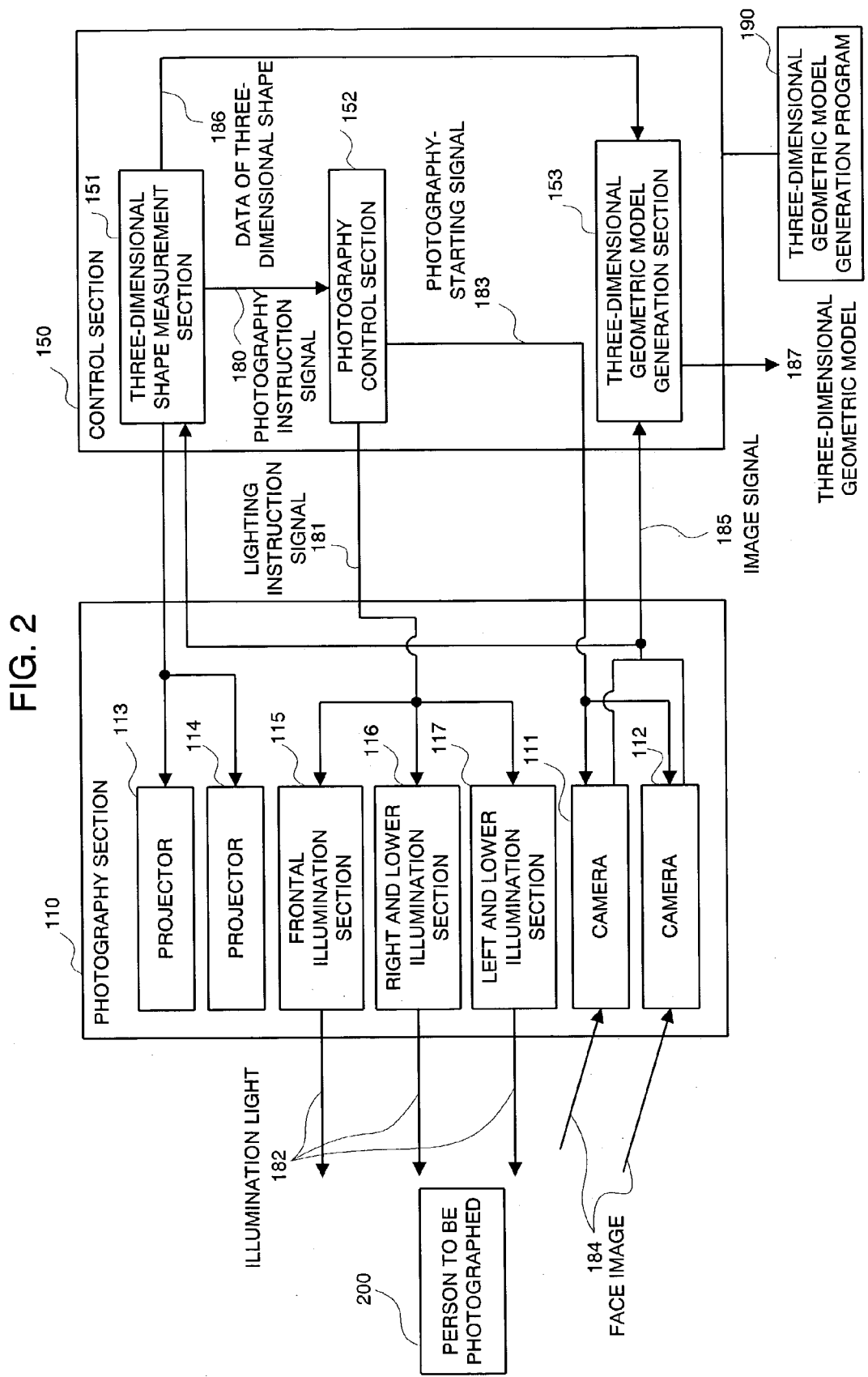
FIG. 2 is a block diagram illustrating a configuration of the three-dimensional geometric model generation apparatus in accordance with the first embodiment of the present invention.

FIG. 1 is a view illustrating an appearance of a three-dimensional geometric model generation apparatus 100 of the first embodiment of the present invention. FIG. 2, which is a block diagram illustrating a configuration of the three-dimensional geometric model generation apparatus 100 in accordance with this embodiment, also illustrates signals etc. to be transmitted/received between each section and the other.

In FIG. 1, the three-dimensional geometric model generation apparatus 100, which is realized by means of a CPU etc. to be program-controlled, comprises a photography section 110 for photographing the face of a person to be photographed 200, and a control section 150 for controlling an operation of the photography section 110 to carry out generation of the three-dimensional geometric model.

Also, the photography section 110 comprises: cameras 111 and 112 for carrying out photography; projectors 113 and 114 for projecting a light pattern (for example, a fringe-pattern light pattern) for measuring three-dimensional shape data indicating a shape of the surface of the face (for example, three-dimensional coordinates of the surface of the face etc.); and a frontal illumination section 115, a right and lower illumination section 116, and a left and lower illumination section 117 that are light sources for texture photography.

Arrangement of each section in the photography section 110 is configured to have the frontal illumination section 115 arranged in the center of a main body section 110-1 having the front thereof sunk in a concave shape, and the cameras 111 and 112 and the projectors 113 and 114 arranged in the left and the right thereof one by one respectively.

Also, arms 110-2 and 110-3 are provided in the lower parts of the right and the left of the main body section 110-1 respectively, and the right and lower illumination section 116 and the left and lower illumination section 117 are arranged in the tip part of each of its arms 110-2 and 110-3 respectively.

The three-dimensional geometric model generation apparatus 100 carries out measurement of the three-dimensional shape and photography of the texture image of the face of the person to be photographed 200 with him/her caused to stand still toward the front.

Figure 6:
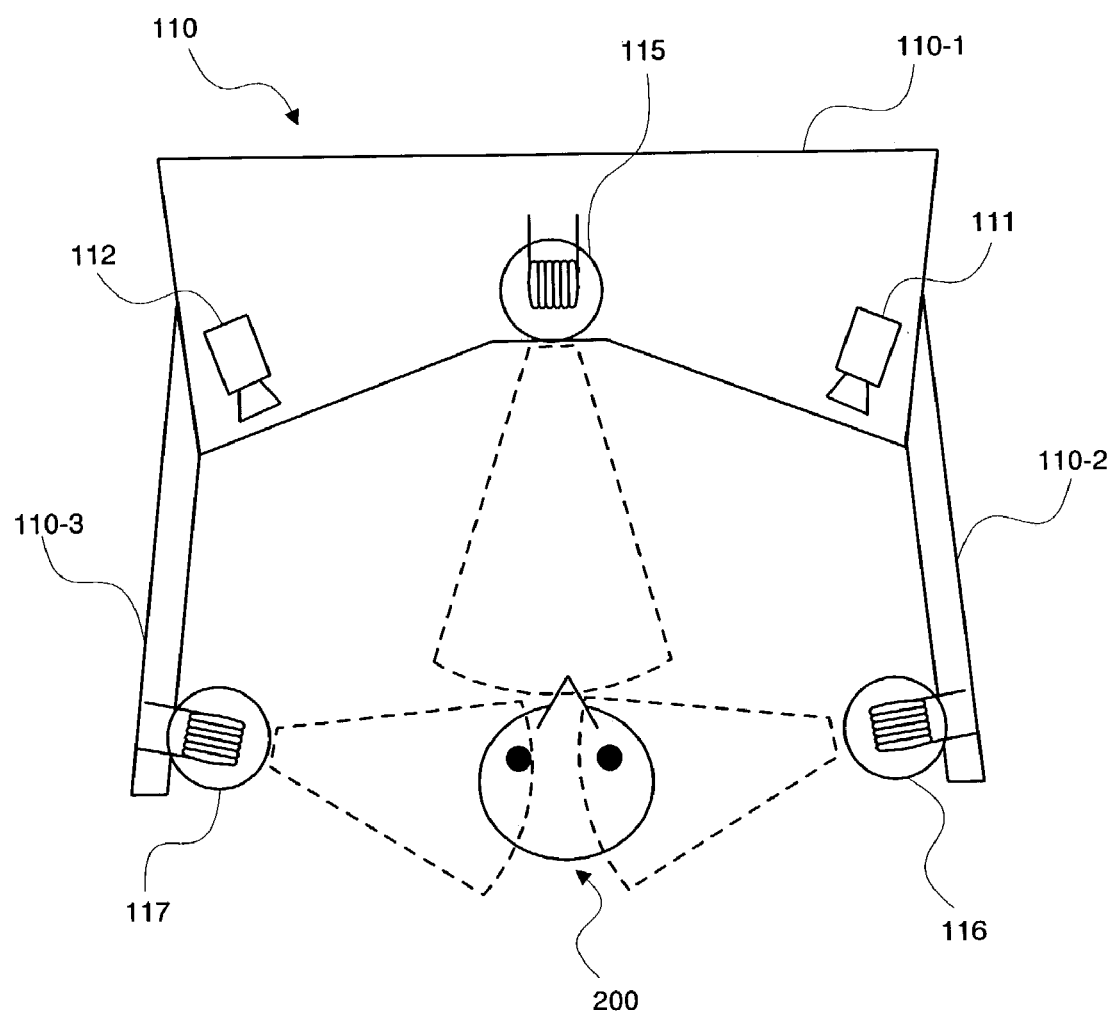
FIG. 6 is a view illustrating an appearance of the three-dimensional geometric model generation apparatus in accordance with the first embodiment of the present invention viewed from the top.
Figure 7:
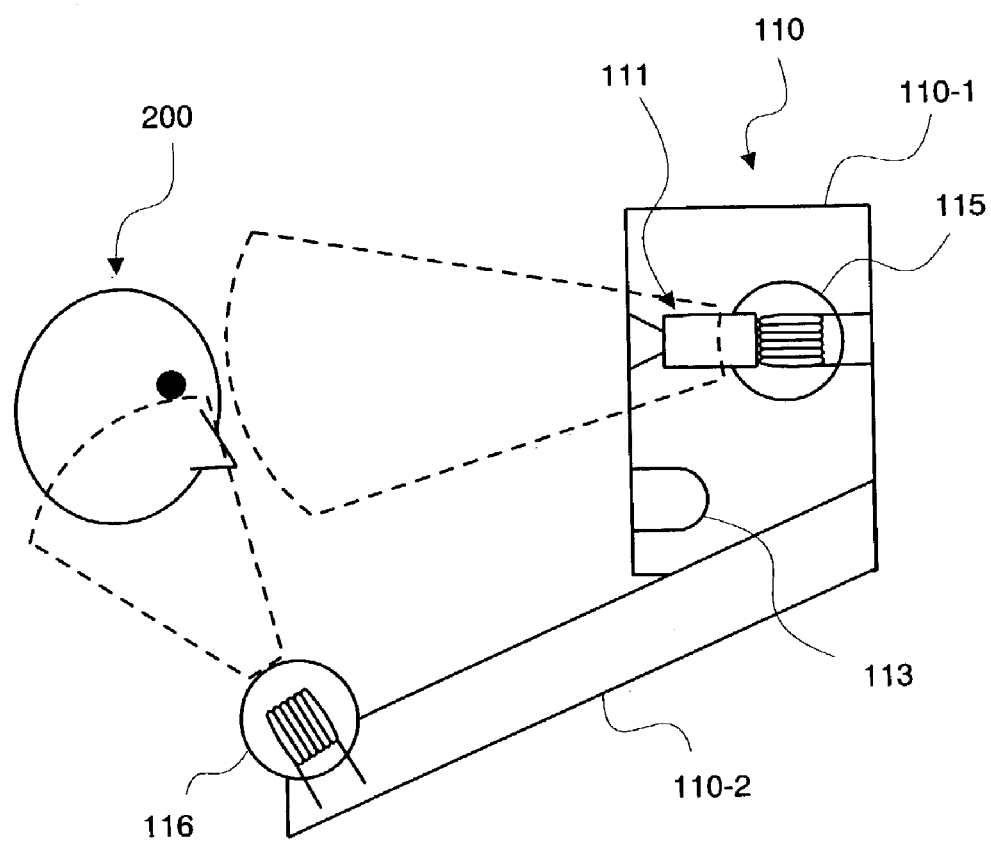
FIG. 7 is a view illustrating an appearance of the three-dimensional geometric model generation apparatus in accordance with the first embodiment of the present invention viewed from the right.

FIG. 6 is a view of the three-dimensional geometric model generation apparatus 100 of this embodiment viewed from just the top. FIG. 7 is a view of the three-dimensional geometric model generation apparatus 100 of this embodiment viewed from the right direction.

As to the measurement method of the three-dimensional shape of the face, various conventional measurement methods of the three-dimensional shape are available. In the three-dimensional geometric model generation apparatus 100 of this embodiment, the cameras 111 and 112 for measuring the shapes of the left and the right of the face respectively, and the projector 113 and 114 for projecting a sine wave pattern for three-dimensional shape measurement are employed to measure the three-dimensional shape of the face. Additionally, as to technology of measuring the three-dimensional shape of the face, the existing technology is employed, whereby detailed explanation is omitted.

The frontal illumination section 115 for the texture photography, which is positioned in the frontal direction of the face of the person to be photographed 200, projects light against the face at the time of the texture photography.

The right and lower illumination section 116 for the texture photography, which is positioned in the right and lower direction of the face, projects light against the face at the time of the texture photography. Also, the right and lower illumination section 116 can be fixed to the photography section 110 as shown in FIG. 1. Furthermore, it is also possible to install it as an independent enclosure.

The left and lower illumination section 117 for the texture photography, which is positioned in the left and lower direction of the face, projects light against the face at the time of the texture photography. Also, the left and lower illumination section 117 can be fixed to the photography section 110 as shown in FIG. 1. Furthermore, it is also possible to install it as an independent enclosure. Additionally, various light sources such as, for example, a fluorescent lamp, an incandescent lamp, and a flush light source are possible to utilize for each of the illumination sections 115 to 117. Also, by diffusing the projected light by obscuring each of the illumination sections 115 to 117 with a tracing paper, and so forth, it is possible to highly enhance an effect of uniformly applying light to the entirety of the face. Also, the number of light sources possible to employ for each of the illumination sections 115 to 117 is variable. Also, utilization of an optical system such as a lens and a reflector plate allows more uniform light to be applied from each direction.

The control section 150 (for example, a personal computer), which is a section for controlling so as to execute the measurement of the three-dimensional shape and the photography of the texture image by turns, comprises a three-dimensional shape measurement section 151, a photography control section 152, and a three-dimensional geometric model generation section 153 as shown in FIG. 2. Additionally, in this embodiment, the measurement of the three-dimensional shape is firstly carried out, and the photography of the texture image is carried out immediately after it;

however this turn is changeable, and the photography is also possible to carry out during the three-dimensional shape measurement.

The three-dimensional shape measurement section 151 measures the three-dimensional shape of the face of the person to be photographed, and transmits a measurement result as three-dimensional shape data 186 to the three-dimensional geometric model generation section 153. Also, when the three-dimensional shape measurement section 151 finishes the measurement of the three-dimensional shape of the face, it transmits a photography instruction signal 180 for instructing the photography of the person to be photographed to the photography control section 152.

When the photography control section 152 receives the photography instruction signal 180 from the three-dimensional shape measurement section 151, it transmits a lighting instruction signal 181 for instructing the lighting to each of the illumination sections 115, 116, and 117 of the photography section 110. Furthermore, the photography control section 152 transmits a photography-starting signal 183 for instructing the photography to the cameras 111 and 112 of the photography section 110.

When the three-dimensional geometric model generation section 153 receives the three-dimensional shape data 186 from the three-dimensional shape measurement section 151, and a texture image signal 185 from the cameras 111 and 112, it searches out a brightness value of the texture image signal at the portion that corresponds to each point of the three-dimensional shape data, based on the received three-dimensional shape data 186 and the texture image 185. Furthermore, the three-dimensional geometric model generation section 153 takes the searched-out brightness value of the texture image signal as color or a reflectance to generate a three-dimensional geometric model 187, and outputs this generated three-dimensional geometric model 187. Additionally, as to a generation method of the three-dimensional geometric model herein, the existing technology is employed, whereby detailed explanation is omitted.

Continuously, an operation in the above-mentioned configuration will be explained.

Figure 3:
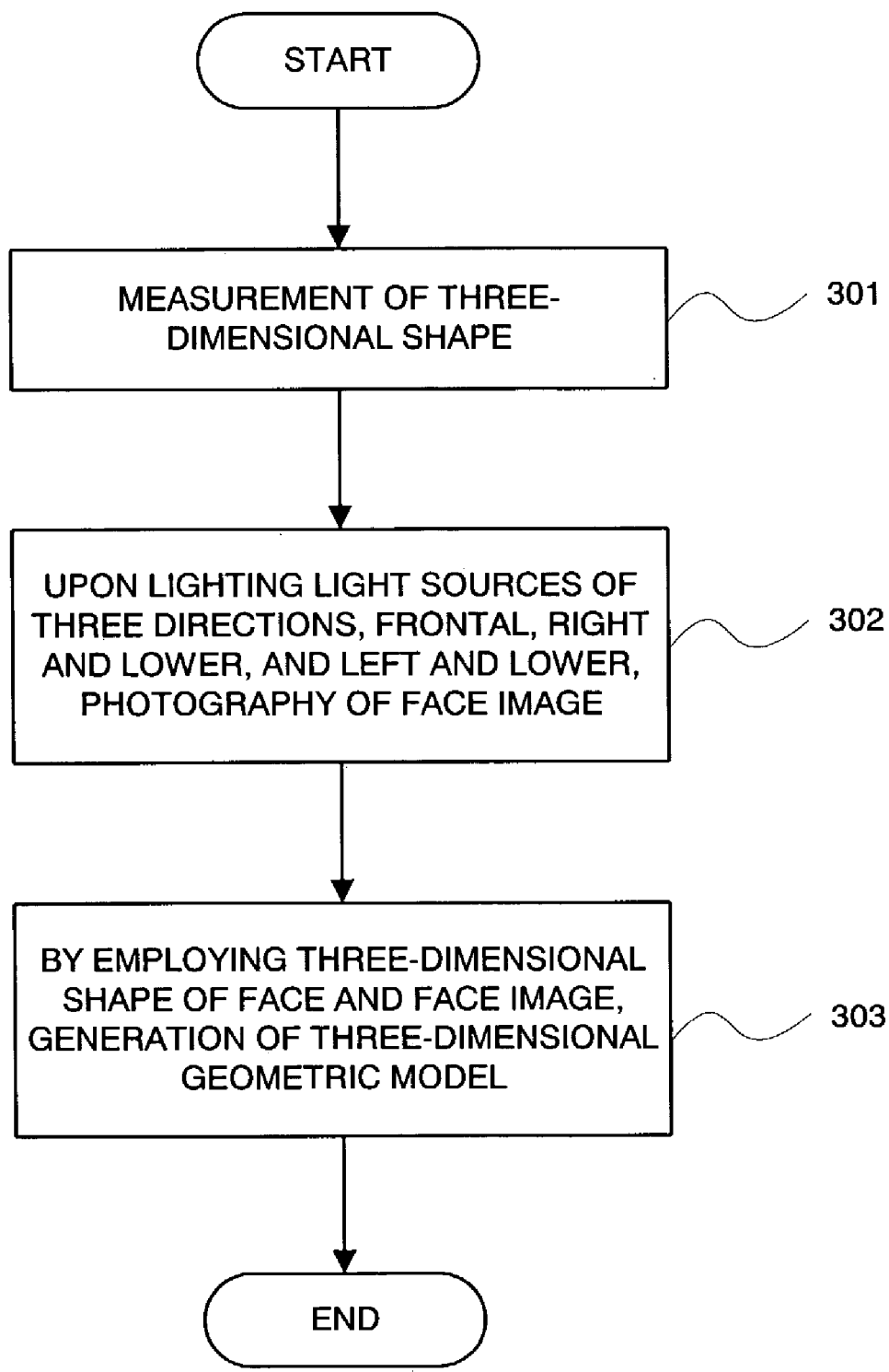
FIG. 3 is a flow chart for explaining an operation of the three-dimensional geometric model generation apparatus in accordance with the first embodiment of the present invention.

FIG. 3 is a flow chart for explaining the operation of the three-dimensional geometric model generation apparatus in accordance with this embodiment.

The three-dimensional shape measurement section 151 measures the three-dimensional shape of the face of the person to be photographed 200, and outputs the three-dimensional shape data 186 to the three-dimensional geometric model generation section 153 (step 301). Also, it outputs the photography instruction signal 180 to the photography control section 152 at this point in time that the measurement of the three-dimensional shape finished.

The photography control section 152 outputs the lighting instruction signal 181 to each of the illumination sections 115 to 117 of the photography section 110 as soon as the photography instruction signal 180 is input into it. Also, the photography control section 152 outputs the photography-starting signal 183 to the cameras 111 and 112 of the photography section 110 when the illumination sections 115 to 117 all light, and photography preparation is arranged (step 302). In such a manner, the photography control section 152 utilizes the cameras 111 and 112 of the photography section 110 to photograph the face of the person to be photographed 200.

The frontal illumination section 115, the left and lower illumination section 117, and the right and lower illumination section 116 project illuminating light 182 for the texture photography to the face of the person to be photographed 200 when the lighting instruction signal 181 is input from the photography control section 152. Herein, a halogen lamp is used for each of the illumination sections 115, 116 and 117, and a power source is to be applied to the halogen lamp according to the lighting instruction signal 181.

Furthermore, when the cameras 111 and 112 receive the input of the photography-starting signal 183 from the photography control section 152, they photograph a face image 184 of the person to be photographed 200, and output this photographed face image 184 as a texture image signal 185 to the three-dimensional geometric model generation section 153. Additionally, a timing at which the face image 184 is photographed by each of the cameras 111 and 112 is immediately after each of the illumination sections 115, 116 and 117 are lighted.

By the way, the frontal illumination section 115 is installed at the location of the distance 65 cm horizontally ahead from a center of a head of the person to be photographed 200 in the frontal direction of the face of the person to be photographed 200. Also, the frontal illumination section 115 projects light against the face at the time of the texture photography.

The right and lower illumination section 116, which is positioned in the right and lower direction of the face, projects light against the face at the time of the texture photography.

The left and lower illumination section 117, which is positioned in the left and lower direction of the face, projects light against the face at the time of the texture photography.

Said illumination sections 115, 116, and 117 are all installed in such a direction that light is projected against the center of the head of the person to be photographed 200.

Figure 5:
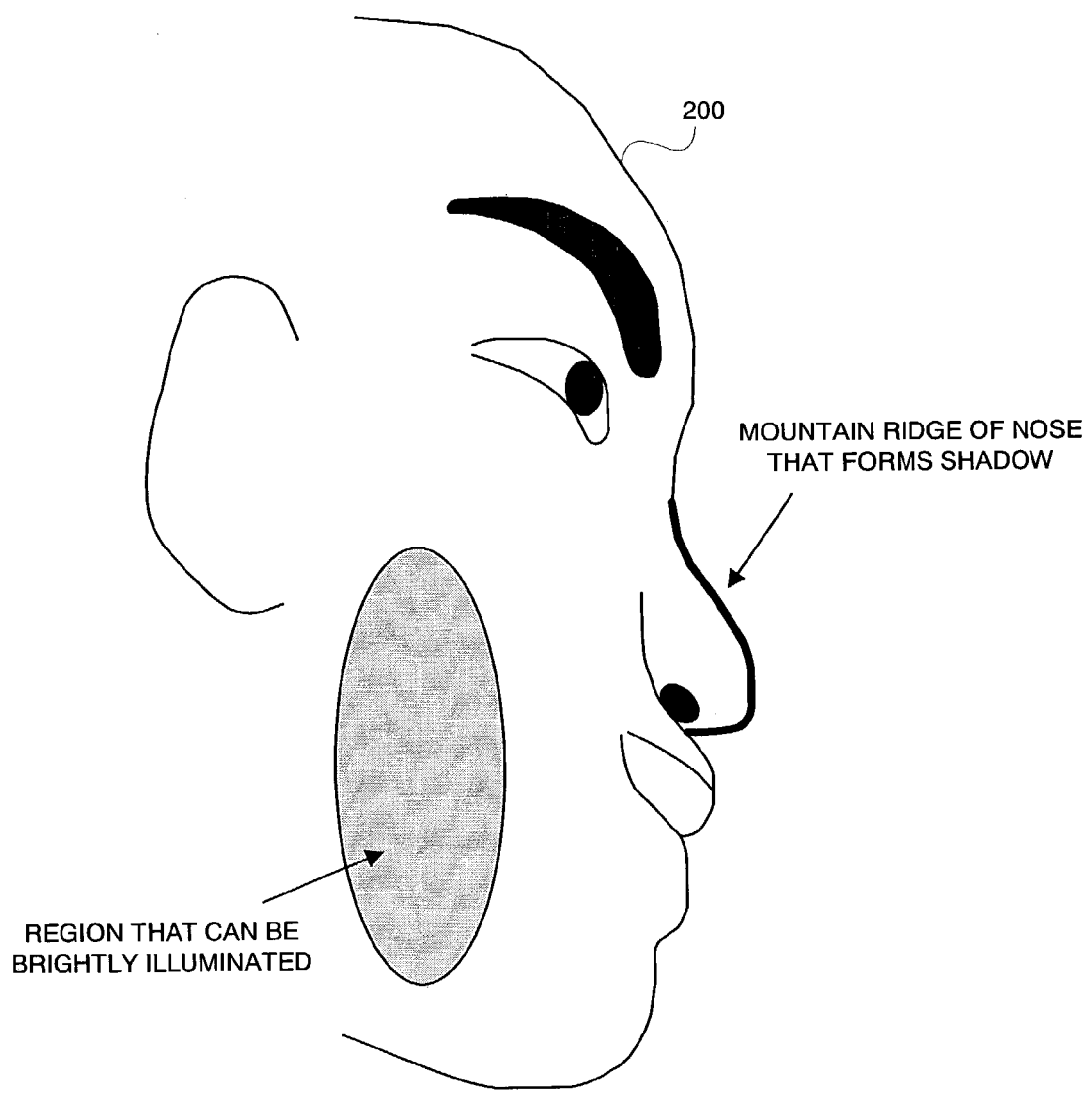
FIG. 5 is a view for explaining the fact that no shadow of a nose occurs at the time of photographing a face image of the first embodiment of the present invention.

Herein, when the face of a subject is viewed from the position of the right and lower illumination section 116, it is visible like FIG. 5. This visible portion is a region to be illuminated by said right and lower illumination section 116.

A ridge of the nose of the person to be photographed 200 of FIG. 5 is expected to become an edge of the shadow of the nose, and to be cast on the visible portion behind it However, the right and lower illumination section 116 was installed at such a position that the face behind the above ridge of the nose was impossible to view as apparent from FIG. 5.

Accordingly, the shadow of the nose is hanging on the entirety of the left half of the face of the person to be photographed 200, and the edge of the shadow is not cast on the face.

Similarly, the left and lower illumination section 117 illuminates only the left half of the face of the person to be photographed 200, and there is no possibility that the edge of the shadow of the nose occurs to the right-half face.

Accordingly, by simultaneously illuminating the left and the right illumination sections 116 and 117, it is made possible that both cheek parts of the person to be photographed 200 are uniformly illuminated, and yet the shadow of the nose does not occur.

The above-mentioned distance and angle of the installation position of each of the illumination sections 115, 116, and 117 is one example to a degree, which can be altered to the size and the shape of the face of the person to be photographed, types of the light sources to be utilized, characteristics of the camera, etc.

Next, when the three-dimensional shape data 186 of the face from the three-dimensional shape measurement section 151, and the texture image signal 185 from the cameras 111 and 112 of the photography section 110 are input respectively, the three-dimensional geometric model generation section 153 employs these kinds of information to generate and output the three-dimensional geometric model 187 of the face (step 303).

Herein, as to the generation method of this three-dimensional geometric model 187, it can be generated by employing the brightness value of the texture image signal 185 instead of color data or reflectance data at each point of the face that is employed in the conventional generation method of the three-dimensional geometric model 187. For example, if the image photographed by employing the present invention is employed as color data of the three-dimensional geometric model, also in the event of generating the CG image having the posture of the subject altered, the impressive image can be generated without causing the unnecessary shadow and shading to occur. Also, when the image photographed by employing the present invention is employed as color data and reflectance data of the three-dimensional geometric model, the CG image generated by altering the illumination can be made close to an image that is more realistic.

As explained above, in accordance with this embodiment, by applying uniform illumination to the surface of the rugged three-dimensional body such as the face of the person etc. the texture image having neither the shadow nor the shading can be photographed. By employing this texture image to generate the three-dimensional geometric model, the impressive CG can be generated.

Additionally, in this embodiment, the case was explained that a halogen lamp was employed as a light source of each of the illumination sections 115, 116, and 117; however employment of the light source is not limited to this case. For example, the other light sources such as a flush lamp having good response are possible to utilize.

A second embodiment will be explained.

Figure 8:
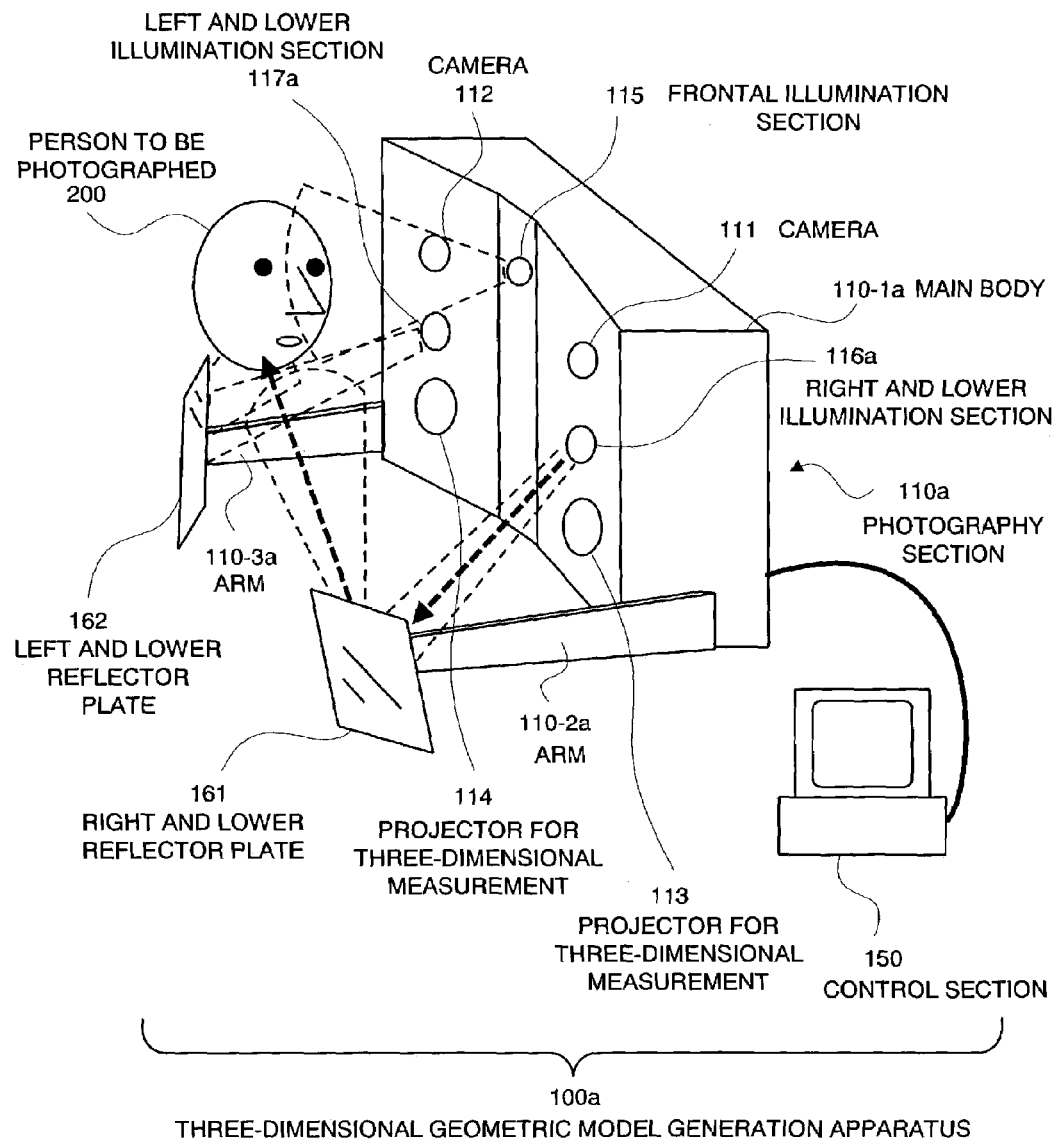
FIG. 8 is a view illustrating a configuration of a three-dimensional geometric model generation apparatus in accordance with a second embodiment of the present invention.
Figure 9:
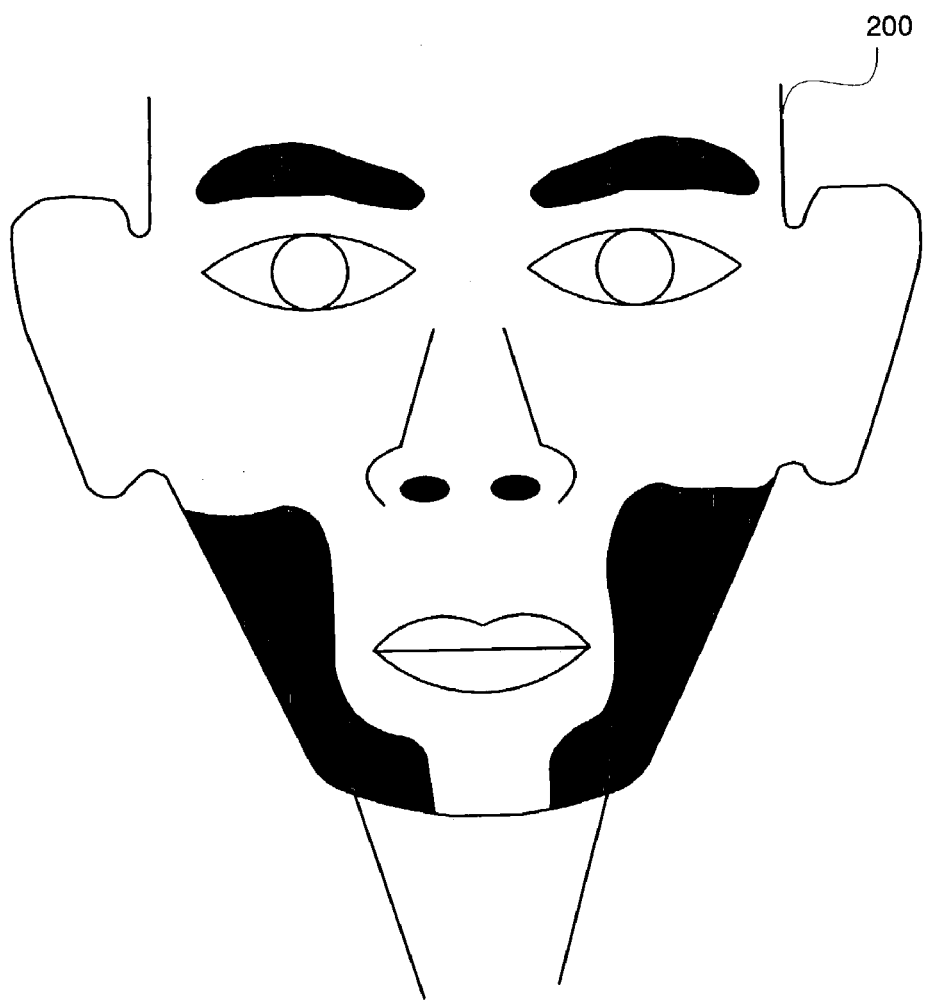
FIG. 9 is a view illustrating shading that occurs to a texture image at the time of having applied light to the face of the person from a frontal direction for photography.
Figure 10:
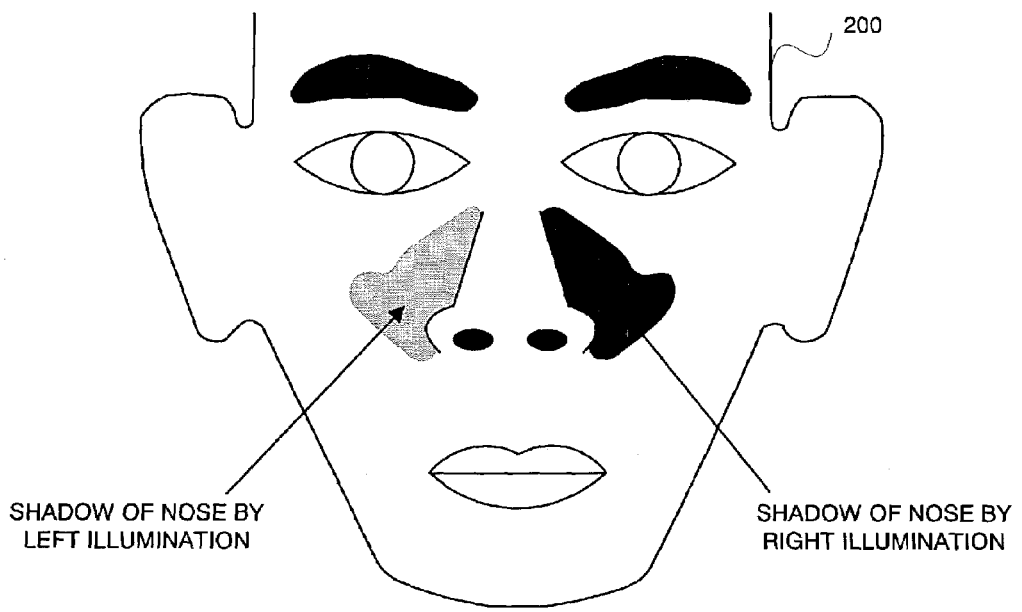
FIG. 10 is a view illustrating shadows that occur to a texture image at the time of having applied light to the face of the person from left and right directions respectively for photography.
Figure 11:
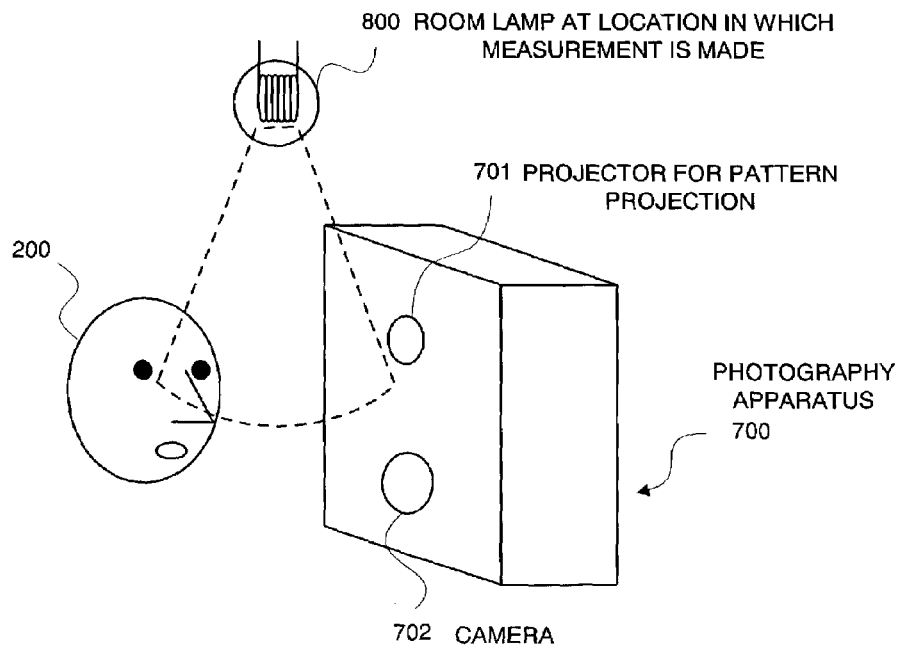
FIG. 11 is a view illustrating an appearance of the conventional three-dimensional geometric model generation apparatus for utilizing a room lamp to photograph a three-dimensional shape.
Figure 12:
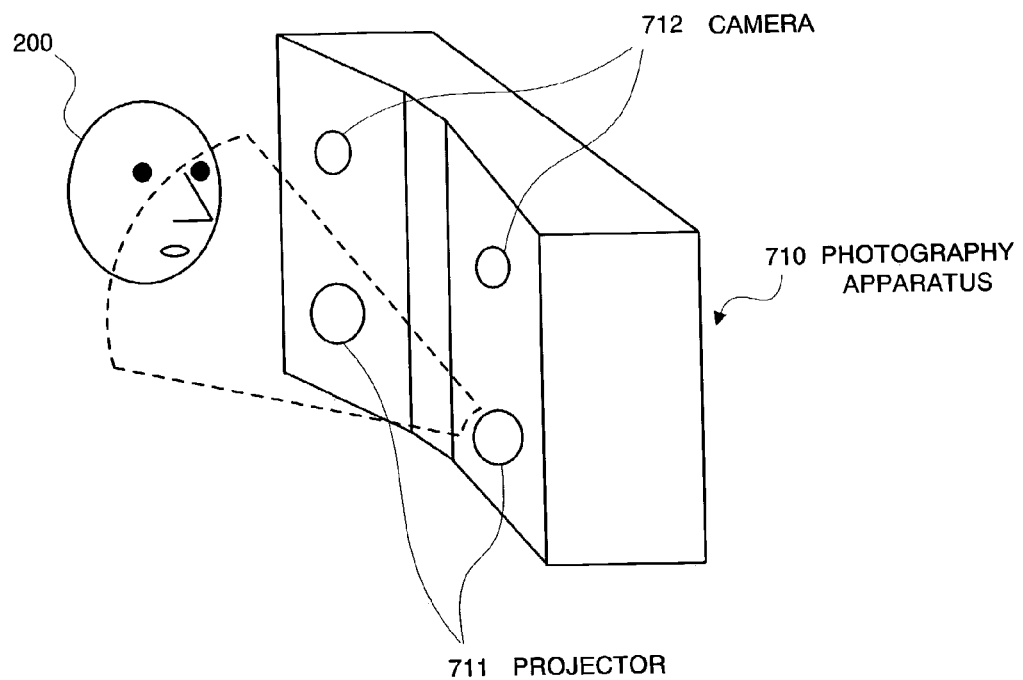
FIG. 12 is a view illustrating an appearance of the conventional three-dimensional geometric model generation apparatus for projecting light from a projector to photograph the three-dimensional shape.
Figure 13:
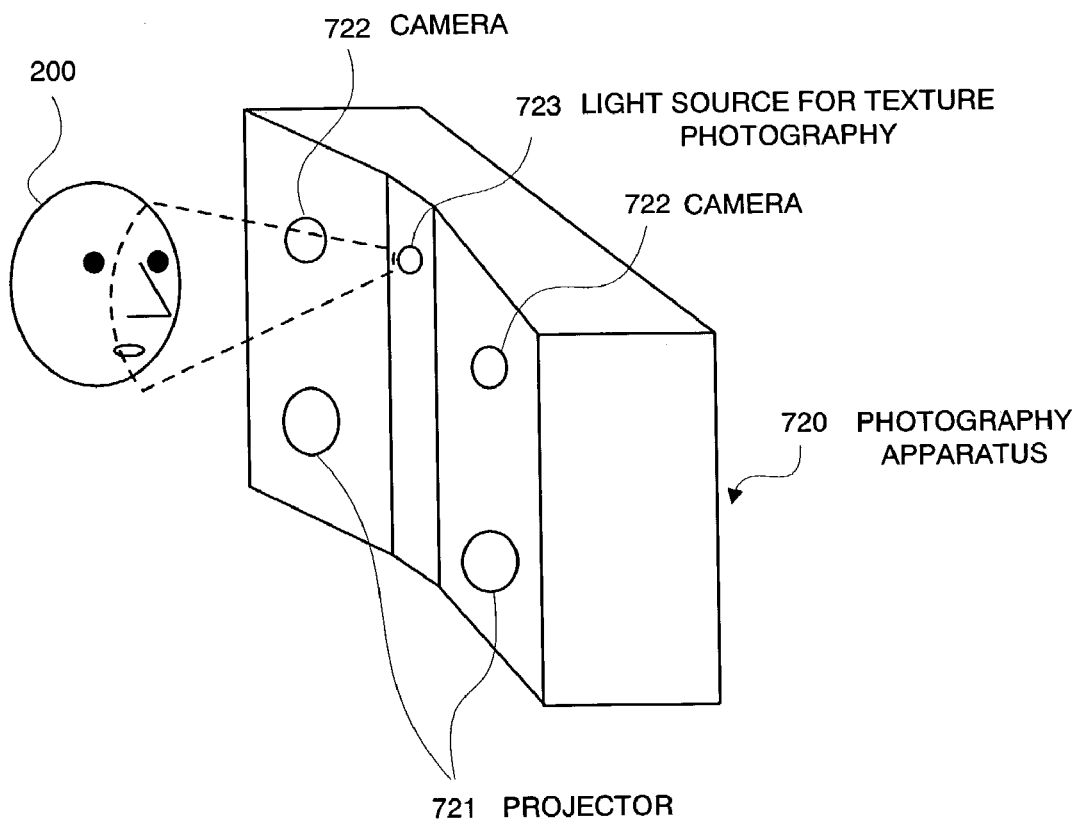
FIG. 13 is a view illustrating an appearance of the conventional three-dimensional geometric model generation apparatus for projecting light from the projector to photograph the three-dimensional shape.

FIG. 8 is a block diagram illustrating a three-dimensional geometric model generation apparatus 100a of the second embodiment of the present invention.

An operation of the three-dimensional geometric model generation apparatus 100a in the second embodiment is identical to that explained in the first embodiment; however it differs from the first embodiment in the positions of a right and lower illumination section 116a and a left and lower illumination section 117a, and in point of comprising a right and lower reflector plate 161 and a left and lower reflector plate 162.

In the second embodiment, the right and lower illumination section 116a, and the left and lower illumination section 117a, which are built-in within the main body of the photography section 110a, project light against the reflector plates 161 and 162 respectively. The reflector plates 161 and 162 reflect light radiated from respective illumination sections 116a and 117a against the face of the person to be photographed 200. The other configurations are similar to that of the first embodiment.

Also, a direction in which the reflector plate of this embodiment is employed to radiate light is not limited to a right and lower one and a left and lower one, but light can be similarly radiated to the face of the person to be photographed by the reflector plate from the frontal direction as well.

Also, the three-dimensional geometric model generation apparatus 100a of this embodiment has arms 110-2a and 110-3a provided in the lower parts of the right and the left of a main body section 110-1a similarly to the first embodiment respectively, and has the reflector plate 161 and the reflector plate 162 (instead of the illumination sections 116 and 117 of the first embodiment) arranged in the tip section of each of its arms 110-2a and 110-3a respectively. However, how to fit the reflector plate 161 and the reflector plate 162 is not limited to a technique of fitting them in the tip of each of the arms 110-2a and 110-3a respectively, but a technique of independently installing them apart from the main body 110-1a is also possible.

As explained above, in accordance with this embodiment, the halogen lamp that causes the neighborhood of the person to be photographed to be at a high temperature does not need to be installed, whereby safety is improved. Also, by utilizing the reflector plate like this embodiment, a user can decide arrangement of the light source more easily and yet freely. Also, employment of a fine and rugged reflector plate allows uniformity of light, which is radiated, to be furthermore enhanced.

Also, in each of the above-mentioned embodiments, the face of the human is taken as an object of generation of the three-dimensional geometric model (or an object of photography) for explanation; however, in addition hereto, the three-dimensional body (for example, a flower vase, a desk stand, a face of a mannequin, a mask, etc.) having the shadow that occurs to the right and lower part, and the left and lower part thereof can be similarly taken as an object of generation of the three-dimensional geometric model.

Additionally, in the three-dimensional geometric model generation apparatuses 100 and 100a of each of the above-mentioned embodiments, functions of the three-dimensional shape measurement section 151, the photography control section 152, and the three-dimensional geometric model generation section 153 in its control section 150, or the other functions may be realized in a hardware manner. Also, these functions can be realized by loading a three-dimensional geometric model generation program 190 comprising each function that is a computer program into a memory of a processing unit of a computer. This three-dimensional geometric model generation program 190 is filed in a magnetic disk, a semiconductor memory, and the other media. And, it is loaded into the processing unit of the computer from its record medium to control the operation of the processing unit of the computer, thus allowing each of the foregoing functions to be realized.

Whereas the present invention has been explained above by listing the preferred embodiments and examples, the present invention is not always limited to the above-mentioned embodiments and examples, and it will be understand that it is intended to encompass various changes and modifications as fall within the scope of its technical thinking for execution.

In accordance with the present invention, in photographing the face of the person, the face image of the person can be photographed so that the entirety of the face is uniformly illuminated, and yet the shadow of the nose is not cast on the face.

Also, the unnecessary shadow and shading do not exist in the photographed image, whereby its image can be employed as visual information at each point of the face in generating the three-dimensional geometric model of the face.

For example, if the image photographed by employing the present invention is employed as color data of the three-dimensional geometric model, the CG image having its posture altered can be generated as an impressive image without causing the unnecessary shadow and shading to occur. Also, if the image photographed by employing the present invention is employed as color data and reflectance data of the three-dimensional geometric model, the CG image generated by altering the illumination can be made close to an image that is more realistic.

What is claimed is:

1. A three-dimensional geometric model generation apparatus for generating a three-dimensional geometric model indicating visual information of a thee-dimensional body, said thee-dimensional geometric model generation apparatus comprising:

light radiation means for simultaneously radiating light against a predetermined plane of said three-dimensional body from a frontal direction, a left and lower direction, and a right and lower direction of the predetermined plane to uniformly illuminate said predetermined plane;

photography means for photographing said predetermined plane of said thee-dimensional body, to which said light is radiated, from at least one direction to acquire an image of said predetermined plane of said thee-dimensional body having neither a shadow nor shading;

based on three-dimensional shape data indicating a thee-dimensional shape of said predetermined plane of said thee-dimensional body, and said image, by acquiring a brightness value at each point of said thee-dimensional shape of said three-dimensional body as said visual information, means for generating said three-dimensional geometric model of said three-dimensional body;

a main body section having a central part thereof sunken in a concave shape; and a frontal-direction light radiation means provided in said center part of said main body section, a left and a right light radiation means provided in arms provided in a left and a right of said main body section respectively, and said photography means provided in fronts of the right and the left of said main body section respectively.

* * * * *